United States Patent
Hung et al.

(10) Patent No.: US 8,013,540 B2
(45) Date of Patent: Sep. 6, 2011

(54) LIGHT ADJUSTING DEVICE FOR A LIGHT EMITTING DIODE AND RELATED LIGHT ADJUSTING METHOD AND LIGHT EMITTING DEVICE

(75) Inventors: Chen-Ming Hung, Hsinchu (TW);
Yi-Te Liu, Hsinchu County (TW);
Chih-Jen Yen, Hsinchu (TW);
Chih-Yuan Hsieh, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 420 days.

(21) Appl. No.: 12/261,057

(22) Filed: Oct. 30, 2008

(65) Prior Publication Data

US 2010/0033102 A1    Feb. 11, 2010

(30) Foreign Application Priority Data

Aug. 5, 2008  (TW) ................................ 97129657 A

(51) Int. Cl.
*G05F 1/00* (2006.01)
*H05B 37/02* (2006.01)
*H05B 39/04* (2006.01)
*H05B 41/36* (2006.01)

(52) U.S. Cl. ........................................ 315/291; 315/307

(58) Field of Classification Search .................. 315/291, 315/224, 246, 297, 307
See application file for complete search history.

(56) References Cited

U.S. PATENT DOCUMENTS

| | | | |
|---|---|---|---|
| 2006/0261754 A1* | 11/2006 | Lee | 315/291 |
| 2008/0024074 A1* | 1/2008 | Mosebrook et al. | 315/291 |
| 2008/0129220 A1* | 6/2008 | Shteynberg et al. | 315/291 |

* cited by examiner

*Primary Examiner* — Daniel D Chang
(74) *Attorney, Agent, or Firm* — Winston Hsu; Scott Margo

(57) ABSTRACT

A light adjusting device for a light emitting diode includes a switch, a detecting unit and an illumination adjusting unit. The switch is coupled to a power terminal, which is utilized for providing power for the light emitting diode. The detecting unit is coupled to the switch, and is utilized for determining a status of the switch, so as to generate a detecting result. The illumination adjusting unit is coupled to the detecting unit, and is utilized for adjusting illumination of the light emitting diode according to the detecting result.

29 Claims, 6 Drawing Sheets

LIGHT ADJUSTING DEVICE FOR A LIGHT EMITTING DIODE AND RELATED LIGHT ADJUSTING METHOD AND LIGHT EMITTING DEVICE

BACKGROUND OF THE INVENTION

1. Field of the Invention

The present invention relates to a light adjusting device for a light emitting diode and related light adjusting method, and more particularly, to a light emitting diode and related light adjusting method for saving cost and being capable of replacing the light system in the prior art.

2. Description of the Prior Art

The light emitting diode has been widely applied in the market because the light emitting diode has the advantage of saving energy. The prior art generally utilizes a microprocessor control unit (MCU) to output a dimming signal to a pulse width modulation controller, so as to adjust illumination of the light emitting diode. Detailed descriptions of the method for adjusting illumination can be seen hereinafter.

Please refer to FIG. 1. FIG. 1 is a schematic diagram of a light adjusting device 1 in the prior art. The light adjusting device 1 is utilized for driving a light emitting diode circuit 10 and adjusting illumination of the light emitting diode circuit 10. The light adjusting device 1 comprises a bridge rectifier 12, a pulse width modulation controller 14, a driving stage 16 and a microprocessor control unit 18 for generating a dimming signal.

The bridge rectifier 12 is utilized for transforming an AC power into a DC power, and providing the DC power to the pulse width modulation controller 14 and the driving stage 16. The driving stage 16 is utilized for driving the light emitting diode circuit 10. The pulse width modulation controller 14 can modulate pulse width of a driving signal generated by driving stage 16 according to the dimming signal generated by the microprocessor control unit 18, so as to adjust illumination of the light emitting diode circuit 10.

Via the pulse width modulation technology, the light adjusting device 1 can adjust illumination of the light emitting diode circuit 10. However, the light adjusting device 1 in the prior art needs the microprocessor control unit 18 to control pulse width modulation, which increases cost and is incapable of replacing the present light system. Thus, improvements are needed.

SUMMARY OF THE INVENTION

It is therefore a primary objective of the claimed invention to provide a light emitting diode and related light adjusting method and light emitting device for saving cost and being capable of replacing the light system in the prior art.

The present invention discloses a light adjusting device for a light emitting diode. The light adjusting device comprises a switch, a detecting unit and an illumination adjusting unit. The switch is coupled to a power end which is utilized for providing power for the light emitting diode. The detecting unit is coupled to the switch for determining a status of the switch, so as to generate a detecting result. The illumination adjusting unit is coupled to the detecting unit for adjusting illumination of the light emitting diode according to the detecting result.

The present invention further discloses a light adjusting method for a light emitting diode. The light adjusting method comprises determining an on-off status of a power for driving the light emitting diode, so as to generate a detecting result, and adjusting illumination of the light emitting diode according to the detecting result.

The present invention further discloses a light emitting device, which comprises a power end, a light emitting diode, a driving stage, a pulse width modulation controller and a light adjusting device.

The power end is utilized for receiving an input power. The driving stage is coupled to the power end and the light emitting diode for transforming the input power into a driving power and outputting the driving power to the light emitting diode according to a pulse width modulation signal. The pulse width modulation controller is coupled to the driving stage for generating the pulse width modulation signal according to a light adjusting signal. The light adjusting device comprises a switch, a detecting unit, an illumination adjusting unit and a storing unit. The switch is coupled to the power end. The detecting unit is coupled to the switch for determining a status of the switch, so as to generate a detecting result. The illumination adjusting unit is coupled to the detecting unit and the pulse width modulation controller for outputting the light adjusting signal to adjust illumination of the light emitting diode according to the detecting result. The storing unit is utilized for storing the present status.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
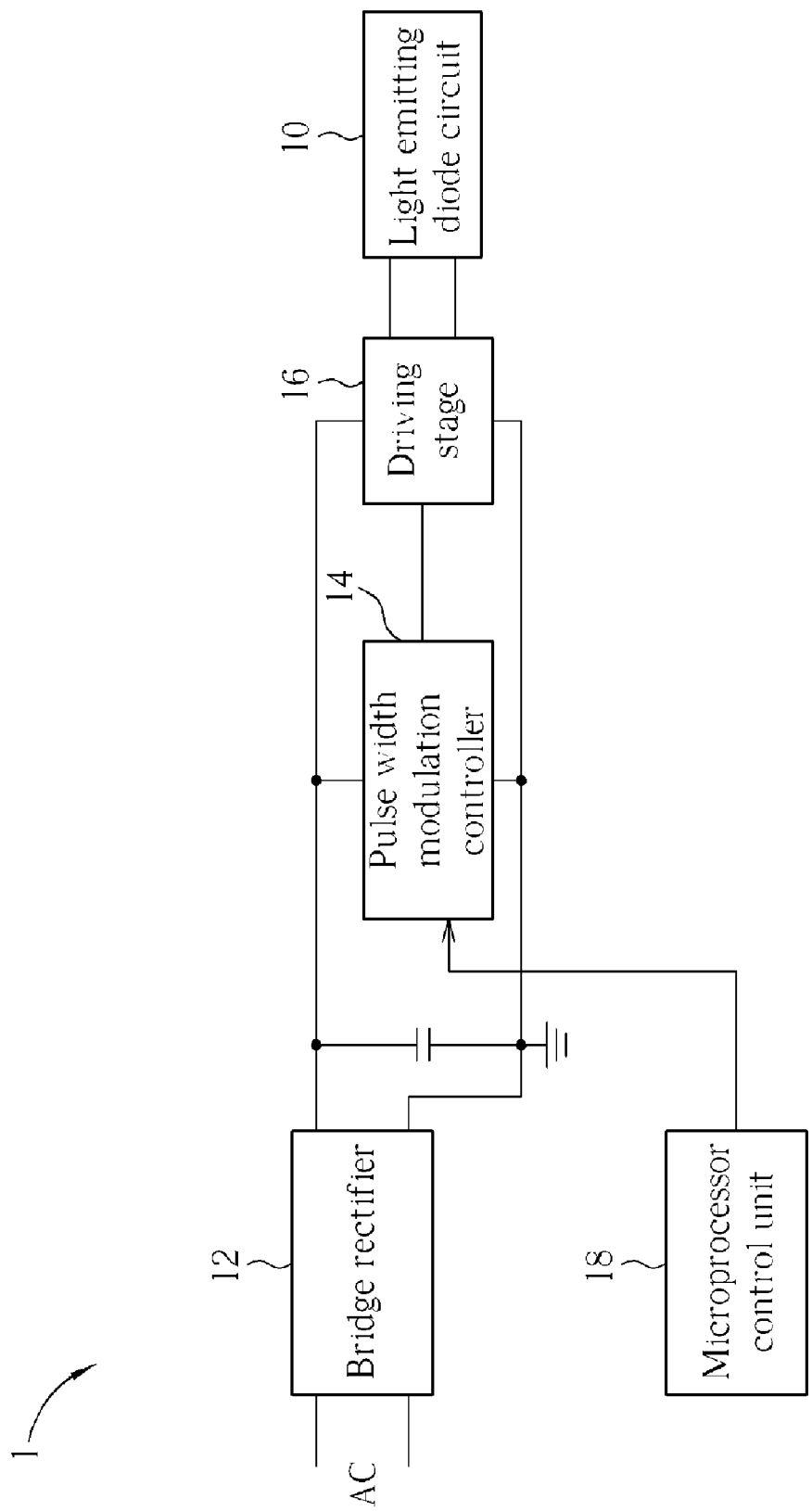
FIG. 1 is a schematic diagram of a light adjusting device in the prior art.
Figure 2A:
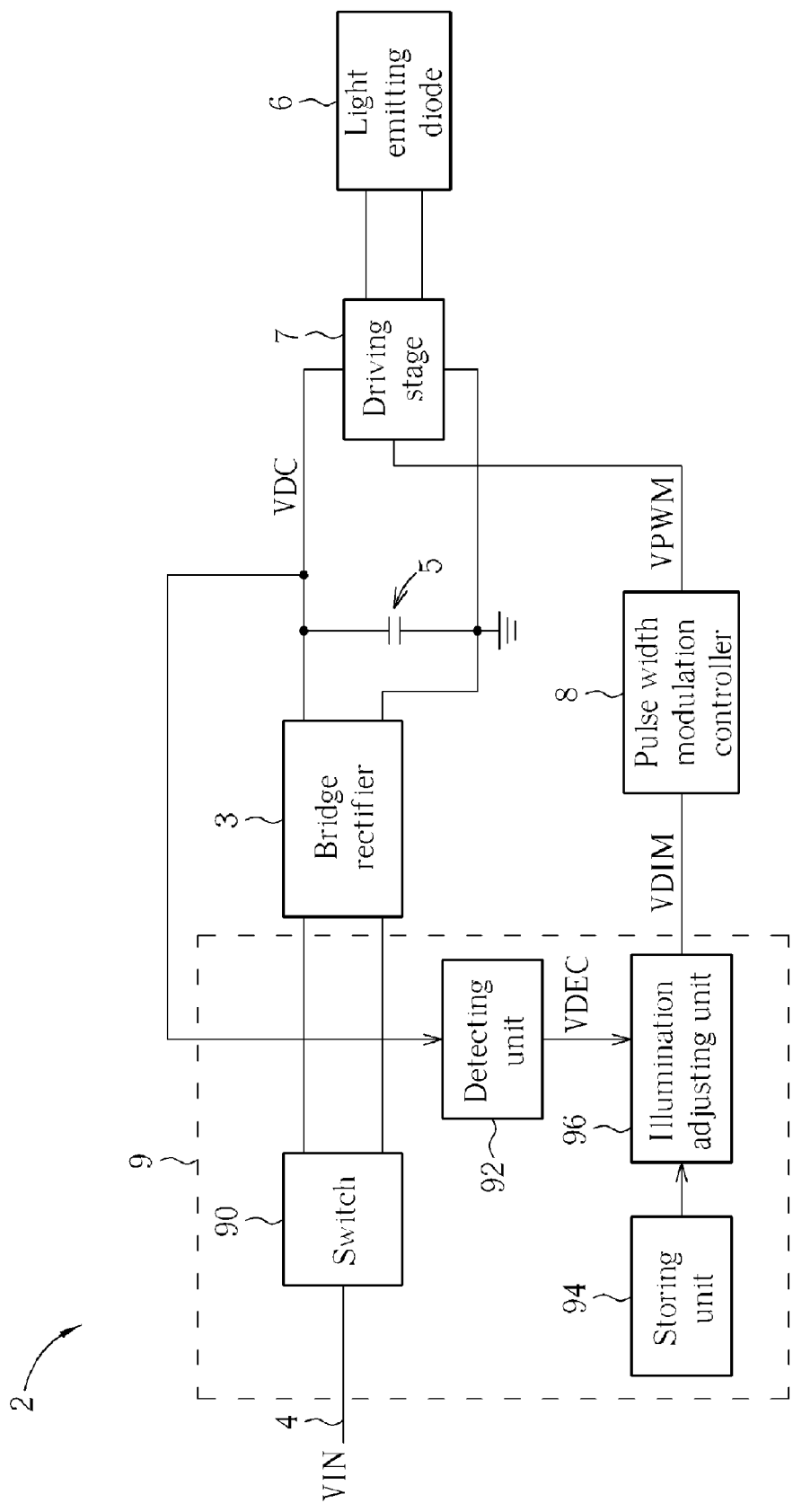
FIG. 2A is a schematic diagram of a light emitting device according to an embodiment of the present invention.

Please refer to FIG. 2A. FIG. 2A is a schematic diagram of a light emitting device 2 according to an embodiment of the present invention. The light emitting device 2 comprises a bridge rectifier 3, a power end 4, a capacitor 5 for regulating voltage, a light emitting diode 6, a driving stage 7, a pulse width modulation controller 8 and a light adjusting device 9.

The bridge rectifier 3 is utilized for transforming an AC power VIN provided by the power end 4 into a DC power VDC, and provides the DC power VDC to the driving stage 7. The driving stage 7 is coupled between the power end 4 and the light emitting diode 6, and is utilized for driving the light emitting diode 6. The pulse width modulation controller 8 is coupled to the driving stage 7, and is utilized for generating a pulse width modulation signal VPWM. Then, according to the pulse width modulation signal VPWM, the driving stage 7 can adjust current flowing through the light emitting diode 6. Moreover, the light adjusting device 9 will generate a light adjusting signal VDIM to the pulse width modulation controller 8. The light adjusting device 9 comprises a switch 90, a detecting unit 92, a storing unit 94 and an illumination adjusting unit 96.

The switch 90 is coupled to the power end 4. The detecting unit 92 is coupled to the switch 90, and is utilized for determining a status of the switch 90, so as to generate a detecting result VDEC. The storing unit 94 is utilized for storing a plurality of driving statuses, each of which is corresponding to an illumination status of the light emitting diode 6. The illumination adjusting unit 96 is coupled to the detecting unit 92, the pulse width modulation controller 8 and the storing unit 94, and is utilized for outputting the light adjusting signal VDIM to adjust illumination of the light emitting diode 6 according to the detecting result VDEC. In detail, the illumination adjusting unit 96 is utilized for choosing a driving status from the plurality of driving statuses according to turned-off times of the switch 90 when the detecting result VDEC indicates that the switch 90 has ever been turned off in a default period, and adjusts illumination of the light emitting diode 6 accordingly. Therefore, the present invention can adjust illumination of the light emitting diode 6 by detecting turned-off times of the switch 90.

Figure 2B:
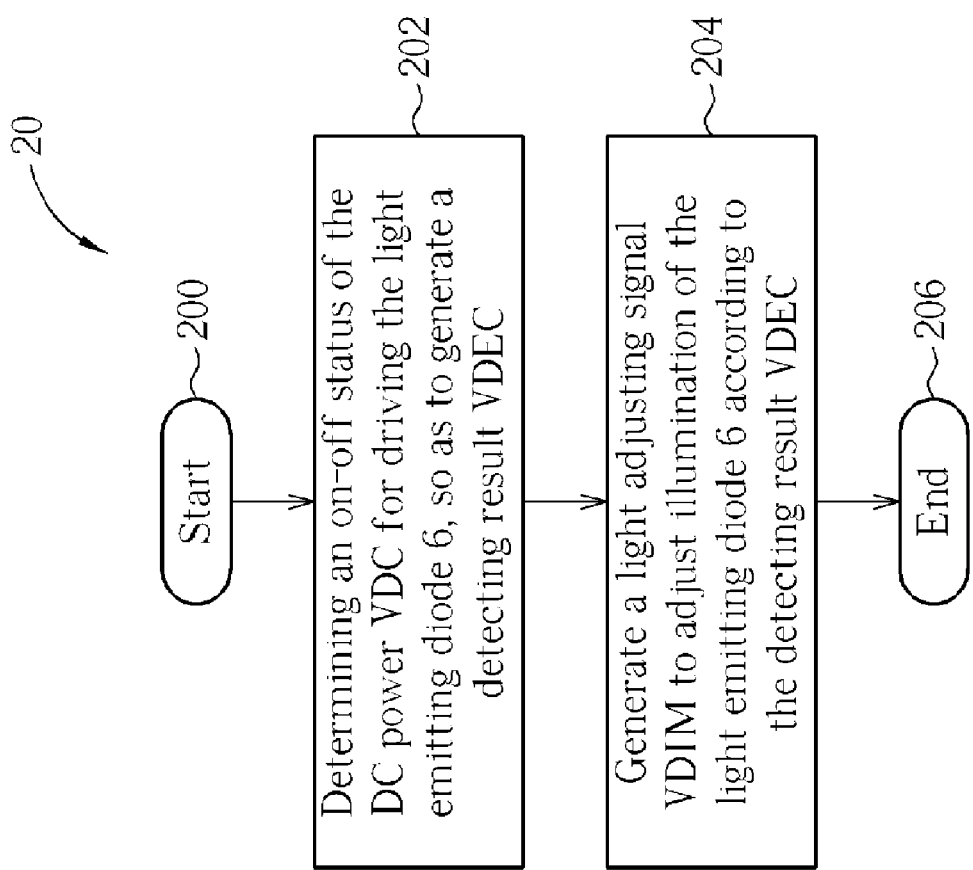
FIG. 2B is a schematic diagram of a procedure according to an embodiment of the present invention.

Please refer to FIG. 2B to obtain detailed operations of the light adjusting device 9. FIG. 2B is a schematic diagram of a procedure 20 according to an embodiment of the present invention. The procedure 20 comprising the following steps:

Step 200: Start.

Step 202: Determining an on-off status of the DC power VDC for driving the light emitting diode 6, so as to generate a detecting result VDEC.

Step 204: Generate a light adjusting signal VDIM to adjust illumination of the light emitting diode 6 according to the detecting result VDEC.

Step 206: End.

Figure 3:
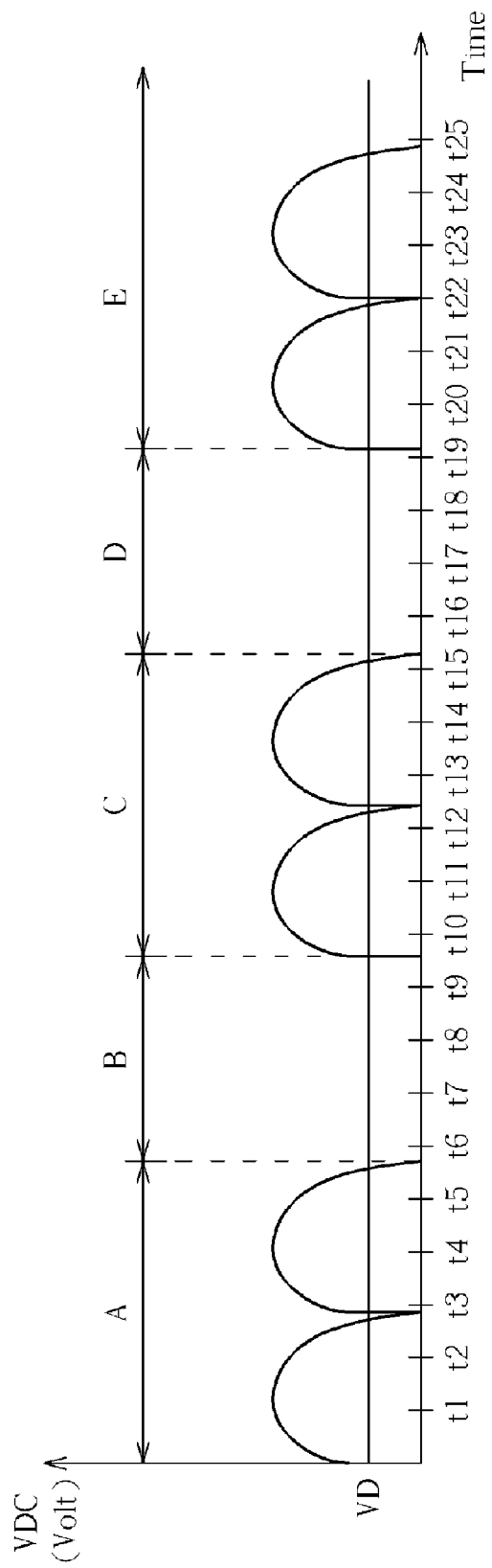
FIG. 3 is a schematic diagram of voltage changes of the DC power shown in FIG. 2A when the switch is turned off.

According to the procedure 20, the light adjusting device 9 determines an on-off status of the DC power VDC, that is, determines if the switch 90 is turned off, to adjust illumination of the light emitting diode 6 according to the corresponding detecting result VDEC. The method of determining an on-off status of the DC power VDC can be referred to FIG. 3. FIG. 3 is a schematic diagram of voltage changes of the DC power VDC shown in FIG. 2A when the switch 90 is turned off. In FIG. 3, VD is a predetermined value for determining if the switch 90 is turned off. When the switch 90 is turned on, e.g. region A, C and E, voltage of the DC power VDC is more than the predetermined value VD. Whereas the switch 90 is turned off, e.g. region B and D, voltage of the DC power VDC is less than the predetermined value VD. Thus, the detecting unit 92 can detect voltage of the DC power VDC. If voltage of the DC power VDC is less than the predetermined value VD, the switch 90 is determined to be turned off, and the storing unit 94 will store the present status.

Figure 4:
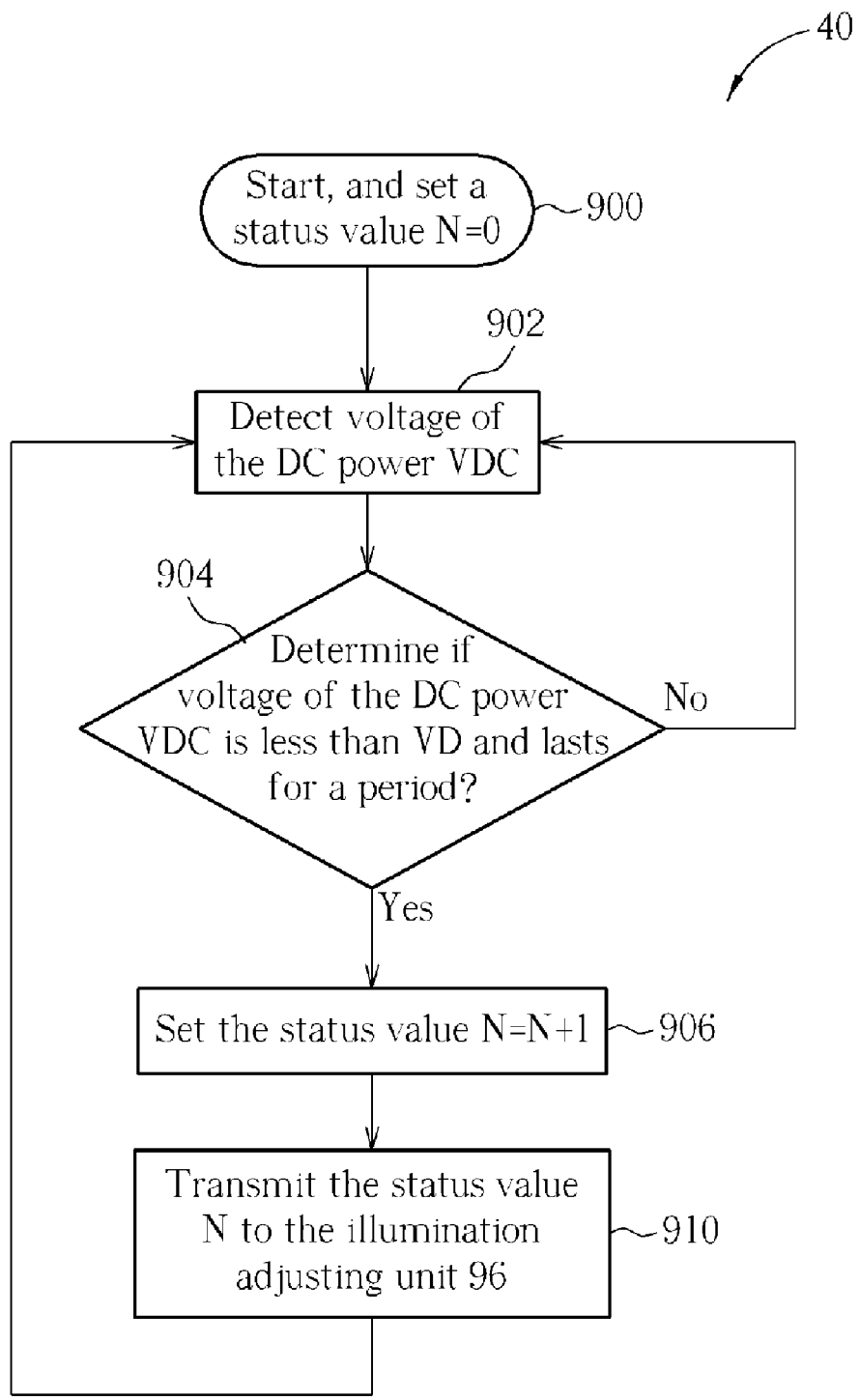
FIG. 4 is a schematic diagram of a procedure according to an embodiment of the present invention.

Moreover, please refer to FIG. 4 to obtain more detail about Step 202 and Step 204. FIG. 4 is a schematic diagram of a procedure 40 according to an embodiment of the present invention. The procedure 40 is utilized for adjusting illumination of the light emitting diode 6 by the light adjusting device 9, and comprising the following steps:

Step 900: Start, and set a status value N=0.

Step 902: Detect voltage of the DC power VDC.

Step 904: Determine if voltage of the DC power VDC is less than VD and lasts for a period? If so, go to Step 906; if no, go to Step 902.

Step 906: Set the status value N=N+1.

Step 910: Transmit the status value N to the illumination adjusting unit 96.

In the procedure 40, the status value N is exactly the detecting result VDEC in Step 204, and each status value N is corresponding to each driving status. The smaller the status value N is, the brighter the light emitting diode 6, or on the contrary, the more the status value N is, the brighter the light emitting diode 6, according to design considerations. Moreover, in Step 904, if voltage of the DC power VDC is less than VD for a default period, that is, the switch 90 is totally turned off, the Step 900 will be performed to set the status value N to be the initial value 0, namely, the initial driving status is chosen.

Therefore, via procedure 40, the detecting unit 92 can detect turned-off times of the switch 90, and transmit the detecting result VDEC to the illumination adjusting unit 96, so as to adjust illumination of the light emitting diode 6.

Figure 5:
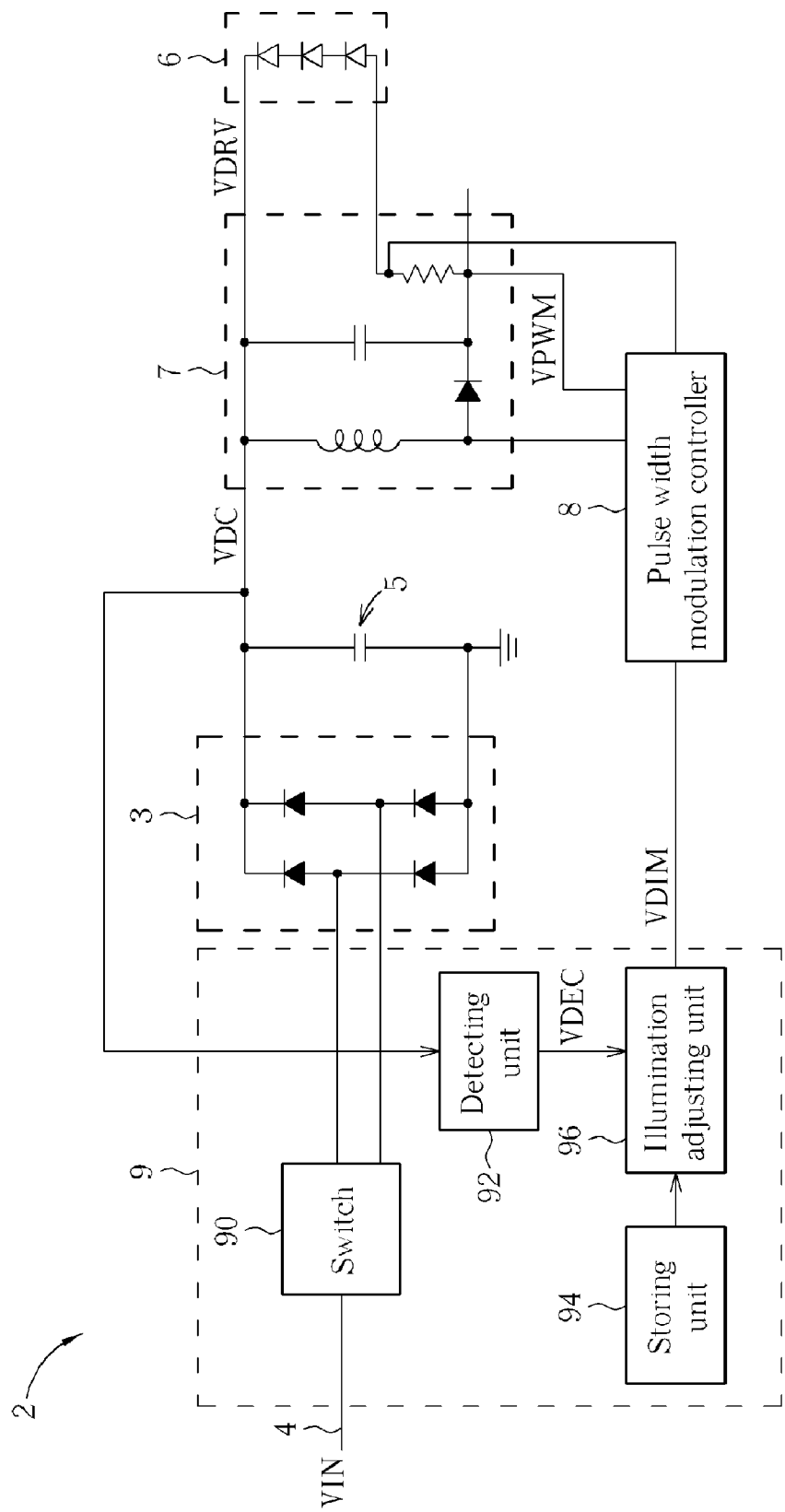
FIG. 5 is a schematic diagram of an implemented circuit of the light emitting device according to an embodiment of the present invention.

Please refer to FIG. 5, which is a schematic diagram of an implemented circuit of the light emitting device 2 according to an embodiment of the present invention. In FIG. 5, the driving stage 7 is a buck-boost converter, but those skilled in the art can make alternations and modifications accordingly. Besides, the detecting unit 92 can be integrated in the pulse width modulation controller 8. In other words, functions originally embedded in the pulse width modulation controller 8 can be utilized for detecting voltage of the DC power VDC, which is the main function of the detecting unit 92.

In conclusion, the present invention utilizes the detecting unit to detect turned-off times of the switch, and transmit the detecting result to the illumination adjusting unit, so as to adjust illumination of the light emitting diode 6, thereby saving cost and being capable of replacing the light system in the prior art.

Those skilled in the art will readily observe that numerous modifications and alterations of the device and method may be made while retaining the teachings of the invention.

What is claimed is:

1. A light adjusting device for a light emitting diode comprising:
    a switch coupled to a power end utilized for providing power for the light emitting diode;
    a detecting unit coupled to the switch for determining turned-off times of the switch, so as to generate a detecting result; and
    an illumination adjusting unit coupled to the detecting unit for adjusting illumination of the light emitting diode according to the detecting result.

2. The light adjusting device of claim 1, wherein the detecting unit determines that the switch is turned off when voltage of the power provided for the light emitting diode is less than a predetermined value.

3. The light adjusting device of claim 2, wherein the voltage of the power provided for the light emitting diode is a voltage provided to a driving stage coupled between the switch and the light emitting diode.

4. The light adjusting device of claim 1 further comprising a storing unit for storing a plurality of driving statuses, each of which is corresponding to an illumination status of the light emitting diode.

5. The light adjusting device of claim 4, wherein the illumination adjusting unit is utilized for choosing a driving status from the plurality of driving statuses according to turned-off times of the switch when the detecting result indicates that the switch has ever been turned off in a default period, and adjusts illumination of the light emitting diode accordingly.

6. The light adjusting device of claim 4, wherein the illumination adjusting unit is utilized for choosing an initial driving status from the plurality of driving statuses when the detecting result indicates that the switch has been turned off for a default period, and adjusts illumination of the light emitting diode accordingly.

7. The light adjusting device of claim 1, wherein the switch is coupled between the power end and a rectifier coupled to the light emitting diode.

8. A light adjusting method for a light emitting diode comprising:
   determining turned-off times of a switch for transmitting power for driving the light emitting diode, so as to generate a detecting result; and
   adjusting illumination of the light emitting diode according to the detecting result.

9. The light adjusting method of claim 8, wherein the step of determining the turned-off times of the switch of the power for driving the light emitting diode, so as to generate the detecting result comprises determining that the switch is turned off when voltage of the power provided for the light emitting diode is less than a predetermined value.

10. The light adjusting method of claim 9, wherein the voltage of the power provided for the light emitting diode is a voltage provided to a driving stage coupled between the switch and the light emitting diode.

11. The light adjusting method of claim 8 further comprising storing a plurality of driving statuses, each of which is corresponding to an illumination status of the light emitting diode.

12. The light adjusting method of claim 11, wherein adjusting illumination of the light emitting diode according to the detecting result is choosing a driving status from the plurality of driving statuses according to turned-off times of the switch when the detecting result indicates that the switch has ever been turned off in a default period, and adjusts illumination of the light emitting diode accordingly.

13. The light adjusting method of claim 11, wherein adjusting illumination of the light emitting diode according to the detecting result is choosing an initial driving status from the plurality of driving statuses when the detecting result indicates that the switch has been turned off for a default period, and adjusts illumination of the light emitting diode accordingly.

14. A light emitting device comprising:
   a power end for receiving an input power;
   a light emitting diode;
   a driving stage coupled to the power end and the light emitting diode for transforming the input power into a driving power and outputting the driving power to the light emitting diode according to a pulse width modulation signal;
   a pulse width modulation controller coupled to the driving stage for generating the pulse width modulation signal according to a light adjusting signal; and
   a light adjusting device comprising:
      a switch coupled to the power end;
      a detecting unit coupled to the switch for determining turned-off times of the switch, so as to generate a detecting result; and
      an illumination adjusting unit coupled to the detecting unit and the pulse width modulation controller for outputting the light adjusting signal to adjust illumination of the light emitting diode according to the detecting result.

15. The light emitting device of claim 14, wherein the detecting unit determines that the switch is turned off when voltage of the power provided for the light emitting diode is less than a predetermined value.

16. The light emitting device of claim 15, wherein the voltage of the power provided for the light emitting diode is a voltage provided to the driving stage.

17. The light emitting device of claim 14, further comprising a storing unit utilized for storing a plurality of driving statuses, each of which is corresponding to an illumination status of the light emitting diode.

18. The light emitting device of claim 17, wherein the illumination adjusting unit is utilized for choosing a driving status from the plurality of driving statuses according to turned-off times of the switch when the detecting result indicates that the switch has ever been turned off in a default period, and adjusts illumination of the light emitting diode accordingly.

19. The light emitting device of claim 17, wherein the illumination adjusting unit is utilized for choosing an initial driving status from the plurality of driving statuses when the detecting result indicates that the switch has been turned off for a default period, and adjusts illumination of the light emitting diode accordingly.

20. The light emitting device of claim 14, wherein the detecting unit is integrated in the pulse width modulation controller.

21. The light emitting device of claim 14, further comprising a rectifier coupled between the switch and the driving end.

22. A light adjusting device for a light emitting diode comprising:
   a switch coupled between a power end and a driving stage connected to the light emitting diode, for controlling power generated from the power end to the driving stage;
   a detecting unit coupled to the switch, for determining a status of the switch, so as to generate a detecting result; and
   an illumination adjusting unit coupled to the detecting unit, for adjusting illumination of the light emitting diode according to the detecting result.

23. The light adjusting device of claim 22, wherein the detecting unit determines the status of the switch according to an input voltage of the driving stage.

24. The light adjusting device of claim 23, wherein the status of the switch is the turn-off times of the switch.

25. A light emitting device comprising:
   a power end for receiving an input power;
   a light emitting diode;
   a pulse width modulation controller coupled to the driving stage for generating a pulse width modulation signal according to a light adjusting signal;
   a light adjusting device comprising:
      a switch coupled to the power end, for transferring the input power from the power end;
      a detecting unit coupled to the switch for determining a status of the switch, so as to generate a detecting result; and
      an illumination adjusting unit coupled between the detecting unit and the pulse width modulation controller for outputting the light adjusting signal to adjust illumination of the light emitting diode according to the detecting result; and
   a driving stage coupled to the switch and connected to the light emitting diode for transforming the input power transferred by the switch into a driving power and outputting the driving power to the light emitting diode according to the pulse width modulation signal.

26. A light adjusting device for a light emitting diode comprising:
   a switch coupled to a power end, for transmitting power from the power end;

a rectifier coupled to the switch;

a driving end, coupled between the rectifier and the light emitting diode, for receiving an input voltage from the rectifier and outputting driving power to the light emitting diode;

a detecting unit coupled to driving end, for generating a detecting result according to the input voltage; and an illumination adjusting unit coupled to the detecting unit for adjusting illumination of the light emitting diode according to the detecting result.

27. The light adjusting device of claim 26, wherein the detecting unit generates the detection result by determining the turn-off times of the switch of the switch according to the input voltage.

28. A light emitting device comprising:

a power end for receiving an input power;

a light emitting diode;

a light adjusting device comprising:

a switch coupled to the power end, for transferring the input power from the power end;

a detecting unit coupled to an input voltage, so as to generate a detecting result according to the input voltage; and an illumination adjusting unit coupled to the detecting unit for outputting a light adjusting signal according to the detecting result;

a pulse width modulation controller coupled to the illumination adjusting unit for generating a pulse width modulation signal according to the light adjusting signal;

a rectifier coupled to the switch;

a driving stage coupled between the rectifier and the light emitting diode and coupled to the pulse width modulation controller, for generating driving power to drive the light emitting diode according to the input voltage and the pulse width modulation signal.

29. The light emitting device of claim 28, wherein the detecting unit wherein the detecting unit generates the detection result by determining the turn-off times of the switch of the switch according to the input voltage.

\* \* \* \* \*